3,515,536
PHENYL-GLYOXIME AS A NOVEL PLANT GROWTH REGULATOR
Kenneth L. Hill, Middleport, and Clinton J. Peake, Medina, N.Y., assignors to FMC Corporation, New York, N.Y., a corporation of Delaware
No Drawing. Continuation of application Ser. No. 433,158, Feb. 16, 1965. This application July 15, 1968, Ser. No. 747,007
Int. Cl. A01n 21/02, 9/20
U.S. Cl. 71—77                    7 Claims

ABSTRACT OF THE DISCLOSURE

Plant growth is enhanced by compositions comprising phenylglyoxime as an essential ingredient. Examples of this plant growth regulant activity include early plant maturation, breaking of bud dormancy, increased fruit size, and promotion of emergence of new axillary shoots.

CROSS REFERENCE TO RELATED APPLICATION

This application is a continuation of our application Ser. No. 433,158, filed Feb. 16, 1965, now abandoned.

This invention relates to a novel and effective composition and method for the regulation of plant growth, employing as an essential active ingredient the compound phenylglyoxime, of the following formula:

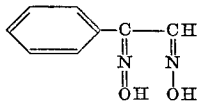

We have discovered that the compound phenylglyoxime, when applied to plants, either growing or dormant, produces remarkably novel and unexpected plant growth regulatory action. We have found that this compound promotes a wide spectrum and assortment of plant responses, quite atypical of known plant growth regulators. For example, phenylglyoxime promotes early maturation of plants and induces early development of fruit. When applied at an optimum growth stage, this chemical is effective as a fruit thinner; and at selected dosage levels, treatments with phenylglyoxime result in a substantial increase in the size of fruit. This compound also promotes early break of bud dormancy. Many other interesting and valuable effects on plant growth may be achieved by treatment with phenylglyoxime at the appropriate growth stage and at the concentration and mode of treatment calculated to achieve the desired growth regulatory effect. We have found that virtually all plants treated have responded in some manner to phenylglyoxime when applied during specific stages of development.

Phenylglyoxime may be prepared by the method of Ponzio and Avogadro (Gazz. chim. ital. 53, 25–35 (1923). This procedure is shown in the following example, which is intended to be illustrative but not limitative of methods useful for the preparation of phenylglyoxime.

Example 1.—Synthesis

A solution of 24 g. of hydroxylamine hydrochloride and 48 g. of sodium acetate in 75 ml. of water was added to a solution of 50 g. of phenylglyoxal aldoxime in 150 ml. of ethanol. The mixture was heated on a steam bath for four hours. It was then concentrated almost to dryness under vacuum and filtered. The solid was fractionally crystallized from water-ethanol to yield 12.0 g. of amphiphenylglyoxime melting at 175–6° C. and 12.0 g. of anti-phenylglyoxime melting at 178–80° C. Either isomer, or a mixture thereof, may be employed in the practice of this invention.

Phenylglyoxime exhibits a wide variety of types of growth promoting activity. For example, acceleration of initiation of bud formation of tobacco plants was obtained as described in the following example:

Example 2.—Growth regulation of tobacco plants

The time required for tobacco plants to initiate bud formation was measured as follows: Individually potted tobacco plants, which averaged eight inches in height and had fifteen true leaves, were treated with solutions of phenylglyoxime in 50% aqueous acetone at rates of 1.0 and 2.0 pounds per acre, employing a spray volume of 86 gallons per acre. The two plants used for each treatment rate and two untreated plants maintained as controls were isolated as single treatment groups in the greenhouse to reduce any effects of vapor activity. The number of days which elapsed before bud initiation are shown in Table 1 below:

Table 1.—Effect on Maturation of Tobacco Plants

| Rate of application, lb./acre | Days to bud initiation | | Axillary bud proliferation |
|---|---|---|---|
| | Rep. I | Rep. II | |
| 1.0 | 25 | 25 | Yes |
| 2.0 | 22 | 25 | Yes |
| Control | 28 | 32 | no |

It is seen from the above results that all treated plants developed buds 3 to 7 days prior to the control plants. The promotion of axillary leaf growth as well as axillary bud proliferation was observed for the treated plants.

Example 3.—Effect of growth stage at time of application

The effect of phenylglyoxime on the maturation and fruit development of tomato plants was determined as follows:

Tomatoes (variety Bonny Best) were seeded in clay pots and, after the plants had emerged, the seedlings were thinned so that each pot contained only one plant. The plantings were staggered so that at the time of treatment five plant growth stages were available. A description of these growth stages is given in Table 2 below. Aqueous acetone solutions of amphi-phenylglyoxime containing 0.1% of the wetting agent "Tween 20" (polyoxyethylene sorbitan monolaurate) and 5.0 p.p.m. and 50.0 p.p.m. active ingredient, respectively, were applied employing a spray volume equivalent to 100 gallons per acre broadcast. For each growth stage two plants were employed for each treatment and two plants which had been sprayed with 0.1% solution of "Tween 20" in aqueous acetone were maintained as controls. The plants were isolated as single treatment groups in the greenhouse and assessment of plant response was made fifty days after the chemical treatments. The results were as shown in Table 2 below, and represent the total number of clusters, total number of weighable fruit, and total fruit weight, for each group of two plants.

TABLE 2.—EFFECT ON FRUIT DEVELOPMENT OF TOMATO PLANTS (VARIETY BONNY BEST)

| Dosage | Total No. clusters | Total No. weighable fruit [2] | Total fruit weight (g.) |
|---|---|---|---|
| Growth stage (1): [1] | | | |
| 5.0 p.p.m. | 13 | 3 | 18.7 |
| 50.0 p.p.m. | 14 | 4 | 10.4 |
| Control | 14 | 0 | 0.0 |
| Growth stage (2): [1] | | | |
| 5.0 p.p.m. | 16 | 1 | 2.1 |
| 50.0 p.p.m. | 16 | 1 | 2.5 |
| Control | 12 | 1 | 8.5 |
| Growth stage (3): [1] | | | |
| 5.0 p.p.m. | 17 | 4 | 138.8 |
| 50.0 p.p.m. | 16 | 6 | 152.3 |
| Control | 15 | 1 | 22.2 |
| Growth stage (4): [1] | | | |
| 5.0 p.p.m. | 11 | 11 | 401.6 |
| 50.0 p.p.m. | [3] 9 | [3] 8 | [3] 170.2 |
| Control | 11 | 7 | 261.1 |
| Growth stage (5): [1] | | | |
| 5.0 p.p.m. | 10 | 10 | 501.5 |
| 50.0 p.p.m. | 12 | 11 | 406.8 |
| Control | 10 | 8 | 435.5 |

[1] Growth stage:

| Description | Age from seed (wk.) |
|---|---|
| (1) Expanding cotyledons | 1 |
| (2) Two true leaves (1 to 1¼ inches long) | 2 |
| (3) Three to four true leaves (3rd and 4th leaves ¾ to 1¼ inches long) | 3 |
| (4) Five to six true leaves | 4 |
| (5) Seven to eight true leaves; minute buds of first cluster barely visible | 5 |

[2] Fruits greater than 5 mm. in cross diameter.
[3] One plant only.

It is seen from the results in Table 2 that fruit development is enhanced appreciably when phenylglyoxime is applied at growth stages (1), (3) and (4), with a lesser effect at growth stages (2) and (5). In general, however, the treated plants were morphologically advanced over the untreated controls, demonstrating that phenylglyoxime promoted the early maturation of tomatoes. Optimum treatments with phenylglyoxime not only increased the number of fruit but also appreciably increased the size of the fruit.

Example 4.—Break of bud dormancy of apple trees

In the course of a growing season, apple trees produce new vegetative buds and fruit buds during the months of July and August. These buds remain dormant or undeveloped until the following spring. In order to initiate break of bud dormancy and subsequent development of new growth the trees must be subjected to a certain period of cold temperature. The length of this period varies with the variety of apple, but in general an exposure of at least two months to temperatures which average below 48° F. is required. If the trees do not receive the necessary amount of chilling they tend to come into leaf slowly and blossom irregularly or they may exhibit no growth at all. This example illustrates the use of phenylglyoxime to initiate the break of bud dormancy in apple trees which have not been subjected to cold temperatures.

Small apple trees (variety McIntosh), two to three years old, were obtained from the field in October before the onset of a prolonged period of low temperatures. The trees were planted in pots and maintained in the greenhouse at temperatures above 60° F. throughout the winter season. In late April the foliage and stems of the trees were sprayed with aqueous acetone solutions of phenylglyoxime containing 0.1% of "Tween 20" as a wetting agent and 5.0 and 50.0 p.p.m. of active ingredient, respectively. At the time of treatment the trees, which averaged twenty-six inches in height with a stem diameter of 0.5 inch at the ground line, still retained foliage from the previous season and possessed dormant vegetative buds. Two trees were employed for each concentration and two trees, sprayed with a 0.1% aqueous acetone solution of "Tween 20," were maintained as controls.

Within five weeks one of the trees treated with 5.0 p.p.m. had produced a new shoot approximately four inches above the ground line. Five and one-half months after treatment, both trees receiving the 50.0 p.p.m. treatment of phenylglyoxime had initiated new growth, whereas the control trees and the second replicate of the 5.0 p.p.m. treatment showed no signs of new growth.

There are many interesting and economically important uses of the plant growth regulator described herein, in addition to those specifically illustrated above. This group of representative tests of various plant species illustrates some of the ways in which phenylglyoxime alters or enhances the normal development of plants. It is indicated that applications of this chemical promote enhanced development at any of several growth-stages of the plant, with optimum treatment levels dependent on the particular growth-stage of the plant as well as the species and variety of plant under study. Multiple treatments of plants offer other possibilities for plant growth regulation; for example, chemicals may be applied at early growth stages to induce early blossom formation, and second applications at the time plants are in bloom would further enhance fruit development. Both retardation and acceleration of plant growth and maturation may be achieved. The natural dormancy of not only fruit trees but also potato tubers and ornamental bulbs and corms, for example, may be broken by application of phenylglyoxime. Early fruit, flowers, and vegetables may be obtained, and the seasonal yield may be increased. Mechanical harvesting may be facilitated by controlled ripening. Horticultural as well as agronomic crops may be benefited. In grafting, the rate of take, and its success, may be improved. The shape of ornamental species may be enhanced, by promoting emergence of axillary shoots. A variety of other applications will be apparent to those versed in the agronomic and horticultural arts.

For all applications, an effective amount and concentration of phenylglyoxime to achieve the desired result should of course be used, with due attention to the growth stage of application. Single or multiple applications may be made, for the same or different purposes, to the same plant.

Application of phenylglyoxime may be made employing the procedures normally used for treatment of plants, including dip or soak treatments of tubers, bulbs, or cuttings, for example, as well as foliar, bark or stem, or soil application. The active ingredient may be utilized in diverse formulations, including the adjuvants and carriers normally employed for facilitating the dispersion of active ingredients for agricultural applications, recognizing the known fact that the formulation and mode of application of a chemical agent may affect its activity in any given application. Thus, phenylglyoxime may be formulated as a solution or dispersion, in aqueous or non-aqueous medium, as a powdery dust, as a wettable powder, as an emulsifiable concentrate, as a granule, or as any of several other known types of formulations, depending on the desired mode of application. These growth regulatory compositions may be applied as sprays, dips, dusts, or granules, in the situs in which growth regulation is desired. These formulations may contain as little as 0.0005% or as much as 95% or more by weight of active ingredient, and applications may be at rates equivalent to less than one-half to over 200 pounds per acre.

Dusts are admixtures of the active ingredient with finely divided solids such as talc, attapulgite clay, kieselguhr, and other organic and inorganic solids which act as dispersants and carriers for the toxicant; these finely divided solids have an average particle size of less than about 50 microns. A typical dust formulation, useful herein, is one containing 1.0 part of phenylglyoxime and 99.0 parts of talc.

Wettable powders are in the form of finely divided particles which disperse readily in water or other dispersant. The wettable powder is ultimately applied to the plant either as a dry dust or as an emulsion in water or other liquid. Typical carriers for wettable powders include fuller's earth, kaolin clays, silicas, and other highly absorbent, readily wet inorganic diluents. Wettable powders normally are prepared to contain about 5–80% of active ingredient, depending on the absorbency of the carrier, and usually also contain a small amount of a wetting, dispersing, or emulsifying agent to facilitate dispersion. For example, a useful wettable powder formulation contains 20.8 parts of phenylglyoxime, 77.9 parts of palmetto clay, and 1.0 part of sodium lignosulfonate and 0.3 part of sulfonated aliphatic polyester as wetting agents.

Other useful formulations for plant applications are the emulsifiable concentrates, which are homogeneous liquid or paste compositions which are dispersible in water or other dispersant, and may consist entirely of phenylglyoxime with a liquid or solid emulsifying agent, or may also contain a liquid carrier, such as xylene, heavy aromatic naphthas, isophorone, and other non-volatile organic solvents. For plant application these concentrates are dispersed in water or other liquid carrier, and normally applied as a spray to the area to be treated. The percentage by weight of the essential active ingredient may vary according to the manner in which the composition is to be applied, but in general, comprises 0.0005% to 95% of active ingredient.

Typical wetting, dispersing, or emulsifying agents used in agricultural formulations include, for example, the alkyl and alkylaryl sulfonates and sulfates and their sodium salts; polyethylene oxides; sulfonated oils; fatty acid esters of polyhydric alcohols; and other types of surface active agents, many of which are available in commerce. The surface active agent, when used, normally comprises from 1% to 15% by weight of the composition.

Other useful formulations include simple solutions of the active ingredient in a dispersant in which it is completely soluble at the desired concentration, such as acetone or other organic solvents. Granular formulations, wherein the chemical agent is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the Freons, may also be used.

Of course the formulation, concentration, and mode of application of phenylglyoxime will be adapted to the particular plant and surrounding circumstances, as is the case in all agronomic applications.

The active growth regulatory compound of this invention may be formulated and/or applied with other agricultural chemicals, such as insecticides, fungicides, nematocides, fertilizers, and the like. In addition, combinations of phenylglyoxime with certain neutral or synthetic plant hormones, such as native auxins, anti-auxins, gibberellins, and kinins, may produce enhanced growth regulatory effects. Other useful combinations, for specific purposes, may be employed. It is apparent that modifications may be made in the formulation and application of the novel growth regulatory agent of this invention, without departing from the inventive concept herein. As will be apparent from the preceding description, use of the words "plant" and "plant growth" in the following claims refers to dormant as well as actively growing plants, and to roots, tubers, bulbs, seeds, cuttings, and the like; i.e., to plants in any stage and manifestation of growth.

We claim:

1. Method of enhancing plant growth which comprises applying a plant growth regulating amount of phenylglyoxime to the situs of the plant.

2. Method of accelerating plant growth which comprises applying an effective amount of phenylglyoxime to the situs of the plant.

3. Method of breaking plant bud dormancy which comprises applying an effective amount of phenylglyoxime to the situs of the plant.

4. Method of thinning fruit which comprises applying an effective amount of phenylglyoxime to the situs of the plant.

5. Method of enhancing fruit size which comprises applying an effective amount of phenylglyoxime to the situs of the plant.

6. Method of accelerating plant maturation which comprises applying an effective amount of phenylglyoxime to the situs of the plant.

7. Method of promoting the emergence of axillary shoots which comprises applying an effective amount of phenylglyoxime to the situs of the plant.

References Cited

UNITED STATES PATENTS

| | | | |
|---|---|---|---|
| 534,095 | 2/1895 | Cole et al. | 71—78 |
| 2,902,514 | 9/1959 | Benneville et al. | 260—566 XR |
| 3,001,908 | 9/1961 | Harrison | 167—22 |
| 2,668,116 | 2/1954 | Wolf | 99—154 |
| 3,063,823 | 11/1962 | Kühle et al. | |
| 3,410,676 | 11/1968 | Hill | 71—77 |

FOREIGN PATENTS 677,982 1/1964 Canada.

OTHER REFERENCES

Singh et al., "The Relation of Chem. Structure to Biological Activity, etc.," pp. 109–140, the Indian Jour. of Hort., vol. 13, No. 3 (1956).

Pfleger et al., "Addition of Nitrosyl Chloride to Unsaturated Alcohols," CA 52, p. 9020 (1958).

Frear, "Catalogue of Insecticides & Fungicides," vol. 1 and 2, pp. 34 and 35 (1947).

Souchay et al., "Behavior of Certain Carboxylic Acid Chloride Oximes, etc.," CA 65, p. 3686 (1966).

LEWIS GOTTS, Primary Examiner

G. HOLLRAH, Assistant Examiner

U.S. Cl. X.R.

111—121; 260—566